Sept. 15, 1931.   C. D. YOUNG   1,823,384
CONTAINER HANDLING SYSTEM
Filed Sept. 17, 1928   2 Sheets-Sheet 1
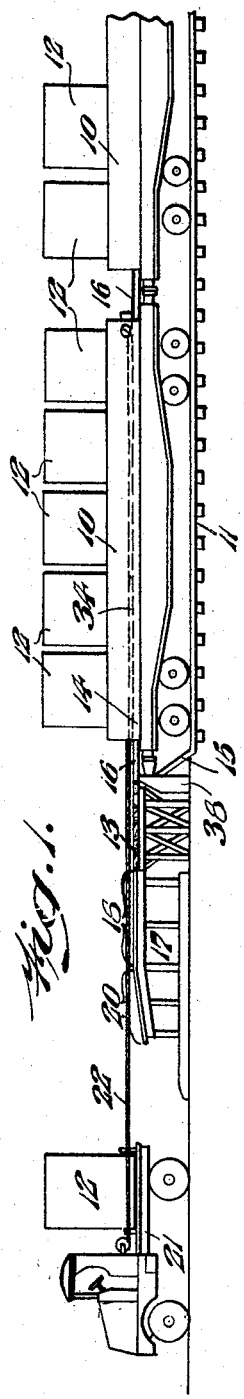
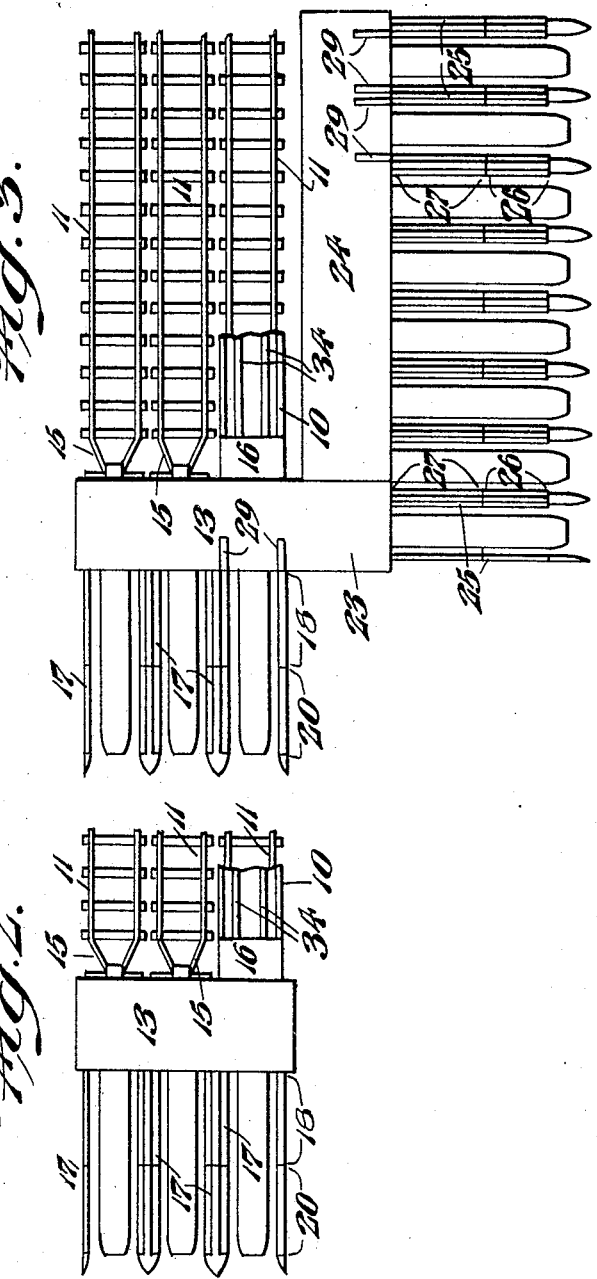
INVENTOR:
Charles D. Young,
BY Robert M. Barr
ATTORNEY.

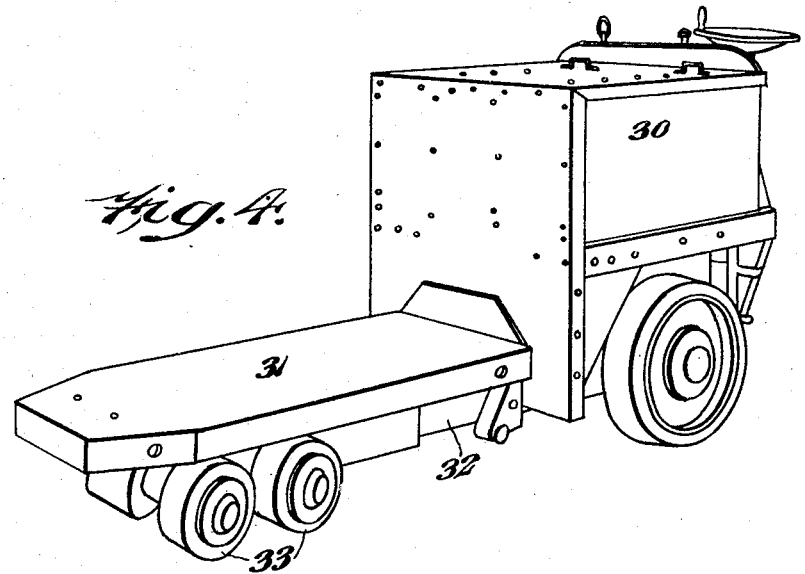
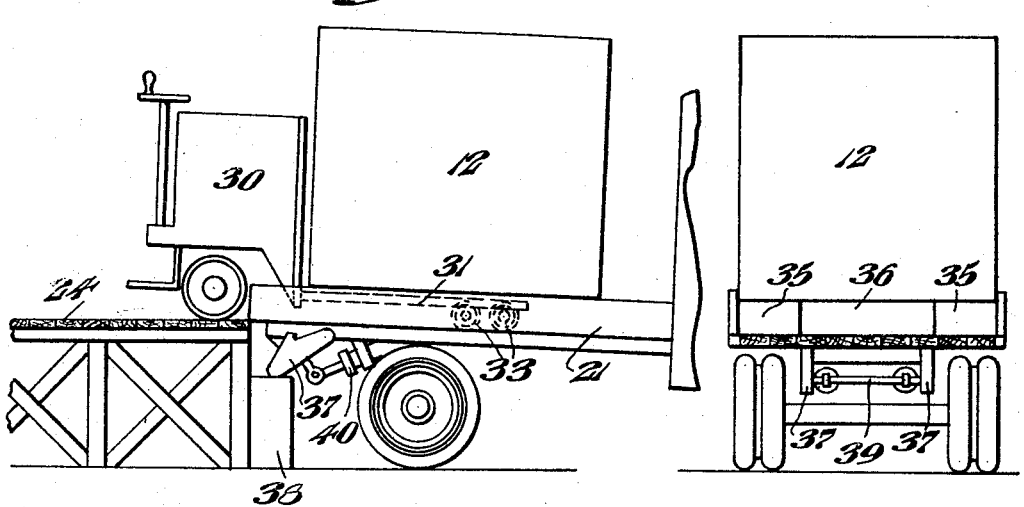

Patented Sept. 15, 1931

1,823,384

UNITED STATES PATENT OFFICE

CHARLES D. YOUNG, OF WAYNE, PENNSYLVANIA

CONTAINER HANDLING SYSTEM

Application filed September 17, 1928. Serial No. 306,550.

The present invention relates to the transportation of merchandise and other commodities and more particularly to the transferring of large commodity containers from one place to another.

Some of the objects of the present invention are to provide an improved system for loading and unloading railway cars of the gondola type or other cars provided with sides and provision for opening the ends thereof; to provide a system for the economical handling of freight containers of large capacity; to provide a container transferring system which can be efficiently put into operation at the end of a terminal track or a stub track or can also be employed with equal facility at a side of a track terminal; to provide a system for automatically removing large capacity containers from a vehicle and transferring such containers to a gondola car with a minimum of manual labor; to provide a system including lift tractors for transferring merchandise containers from a receiving support or a storage support to a railroad car and vice versa; to provide a system which is arranged to operate efficiently in connection with single or multiple track terminal, and to provide other improvements as will hereinafter appear.

In the accompanying drawings, Fig. 1 represents a side elevation of a track terminal container handling system equipped with one form of the present invention; Fig. 2 represents a plan of the terminal; Fig. 3 represents a plan of a modified form of the invention; Fig. 4 represents a perspective of one form of small automatic truck for conveying containers; Fig. 5 represents a side elevation of a truck delivering a container directly to a receiving platform through the medium of a small automatic truck; and Fig. 6 represents a truck provided with a body depression for receiving a container removing truck.

Referring to the drawings, one form of the present invention is shown as applied to the loading and unloading of railroad cars 10 of the gondola type at a railway terminal or end of a stub track 11. While the invention is adapted for loading cars on a single track, it will more generally be employed with two or more tracks and for that reason several tracks are shown though the description will be confined to a single track to avoid mere duplication.

In order to locate the articles, such as heavy containers 12 filled with bulk commodities, in position for loading upon a gondola car or other car having sides and removable or open ends, a platform 13 is constructed transversely to the direction of the track or tracks 11 in such a position that its supporting floor lies substantially in the same horizontal plane of the floor 14 of the car 10 while one side parallels the car end leaving a clearance above the car stop abutment 15. In loading and unloading operations this clearance is bridged by an apron 16 which is movable but in operative position rests at opposite sides respectively on suitable support ledges so that its floor forms a continuation of the platform floor and the car floor.

Where space at the terminal permits, means are provided at the side of the platform 13 opposite to the tracks for delivering a container or containers 12 directly to the platform 13. In the present construction, this means consists of one or more pairs of ramps 17 arranged side by side with discharge ends terminating above the floor of the platform 13, one portion of each pair of ramps forming a horizontal supporting section 18 and another portion an upwardly inclined section 20 leading from a point below the floor line up to a level above that line. Where there is only a single track one pair of single ramps 17 are used, while for double tracks it is preferable to employ double ramps between the two end single ramps as this allows two containers to be simultaneously received by two adjacent pairs of ramps. Each pair of ramps is spaced a distance slightly greater than the width of the truck 21 which delivers the containers for loading and the relative positions of the ramps is such that as a truck moves in between two ramps the inclined section will be in the path of the projecting sides of the container and thereby cause the container to ride upwardly to the horizontal section 18 where it is independent of the truck body. The power actuated cable 22 serves to skid the container or containers from the ramp section to the platform 13, and from platform 13 to car 10, either by power winch on truck as shown or by the tractive power of the truck itself. The cable from the truck s first passed through the snatch block to one or more of the cars as required, and then to the container. When moving from car to skid the cable is directly attached to the container.

Where there is only space at the ends of the tracks for the platform 13 provision is made for receiving and delivering the containers at one side of the tracks by constructing an extension 23 to the platform 13 and locating an auxiliary platform 24 parallel to the tracks and in end abutting relation with the extension 23. Since the floor levels of the extension 23 and platform 24 are the same, a continuous angular shaped path of travel for the containers is provided.

In order to load and unload containers from a truck or trucks one or more pairs of ramps 25 are constructed and arranged at the outer side of the platform 24 so that containers can be conveniently delivered to and from the platform. Each pair of ramps 25 consist of an upwardly inclined section 26 leading to a horizontal supporting section 27, the latter having its end in abutting relation with respect to the auxiliary platform 24 and at the same floor level. The ramps 25 of each pair are spaced to allow a truck body to freely pass between them while the height of the ramps is such as to bring the floor level of the section 27 above the floor of the truck. Since the inclined section 26 is arranged in the path of the sides of a container supported upon the truck, the backing in of a truck causes the container to automatically ride upward upon the section inclines, be removed from the truck body, and be deposited upon the horizontal section 27.

For economically transferring the containers from the ramps 25 to the cars or from the latter to the former, relatively small motor driven lift cars 30 are provided having a container supporting platform 31 mounted upon a mechanically elevated frame 32 which is carried by the chassis of which the wheels 33 are a part. The wheels 33 are relatively small in diameter so that the floor of the platform 31 is close to the surface upon which the car 30 travels, and therefore shifting of the container can take place with a minimum change of level. In other words, the platform 31 is at such a height that a very small lift of the cotainer is required to deposit it upon the car 30. With a container upon the platform 31, the car 30 can be driven along the platform 24 to the railway car to be loaded and the container is then unloaded by backing the platform 31 of the car 30 between skids 34 placed upon the floor of the car at a distance apart to receive the sides of the container when the car platform 31 is lowered. Thus a lowering of the platform 31 results in the container being transferred to the skids 34 and the lift car 30 is then free to withdraw and resume transferring operations with other containers. To permit the car 30 to be run under a container as delivered from the ramp rails 17, portable skids 29 are provided which can be moved from one place to another on the platforms 13 and 24 and placed in alignment with the ends of the ramp rails. These skids 29 are of a height to bring the top surface thereof to the level of the ramp rails 17, and hence the car 30 can be run into place between them and beneath the container, after which its platform 31 can be lifted to transfer the container.

Where it is desirable to transfer the containers directly from a truck to a platform or vice versa provision is made for supporting the containers on the trucks 21 above the level of the truck floor. This is preferably accomplished by placing two blacks 35 lengthwise of the truck floor and spaced apart to form a longitudinal depression or slot 36 of a size to receive the platform end of the lift car 30. Thus where the track platform 24 corresponds in level with the floor of the trucks 21 used for delivering and removing containers, it is only necessary to back the truck against the platform and then operate a lift car 30 to bring its platform 31 into position in the slot 36 beneath the container to be removed. The automatic lift mechanism of the car 30 is then started and continued in operation until the container is lifted from the blocks 35 and rests upon the lift car platform 31 when the car 30 can then be driven to the railway car or other place where the container is to be transferred.

In case the track platform 24 is not at the same level as the floor of the truck 21, the desired flush condition can be automatically brought about by utilizing certain driven parts of the truck motor. In the present instance this is done by mounting pivoted cam levers 37 at opposite sides of the truck body and in close proximity to the discharge end of the truck, for seating upon the top of an abutment block 38 mounted in front of the platform supporting structure. These levers 37 are connected to an operating rod which is controlled by a jack 40 preferably of the hydraulic type which is actuated from the motor of the truck 21. In operation, a truck 21 is backed into position against the platform 24 with the cam levers 37 resting upon the abutment block 38 and the jack operating mechanism is then started to cause the levers 37 to raise the truck floor until it is flush with the floor of the platform 24. Then the jack mechanism is stopped and a lifting car 30 can be run into place in the slot 36 to bring its platform 31 under the container which is supported by the spaced blocks 35. When so placed, the platform of the lift car 30 is automatically raised to lift the container from the blocks 35 and the car 30 can then take the container to its adjacent destination.

While one form only of the present invention has been here illustrated and described, it is to be understood that the invention is not limited to any specific construction, but might be applied to various forms without departing from the spirit of the invention or the scope of the appended claims.

Having thus described my invention, I claim:

1. A container handling system comprising in combination a terminal of a railroad track, a platform having a portion extending along the side of said track and a portion extending across the end of said track, a plurality of container supporting ramps terminating in close proximity to the side portion of said platform, means for automatically delivering a container from a motor truck to said ramp rails, skids arranged to be aligned respectively with said ramp rails, and motor driven vehicles for conveying containers from said skids along said platform and to a car on said track each of said vehicles having a power operated vertically movable container receiving platform.

2. A container handling system comprising a railroad track, a ramp structure adjacent thereto, a platform interposed between said track and structure and operatively associated with both, a motor truck arranged to enter said ramp structure to automatically receive or deposit a container, means on said platform to receive a container from said ramp structure and support it in spaced relation to said platform with an entrance to said space at one end, and a conveying means including a vertically movable platform for entering said space and removing said container from said supporting means whereby said container can be transferred to a car on said railroad track.

Signed at Philadelphia, county of Philadelphia, State of Pennsylvania, this 10th day of September, 1928.

CHARLES D. YOUNG.